Nov. 15, 1932.      D. T. ADAMS      1,887,727
AUTOMOBILE LICENSE HOLDER
Filed July 15, 1931
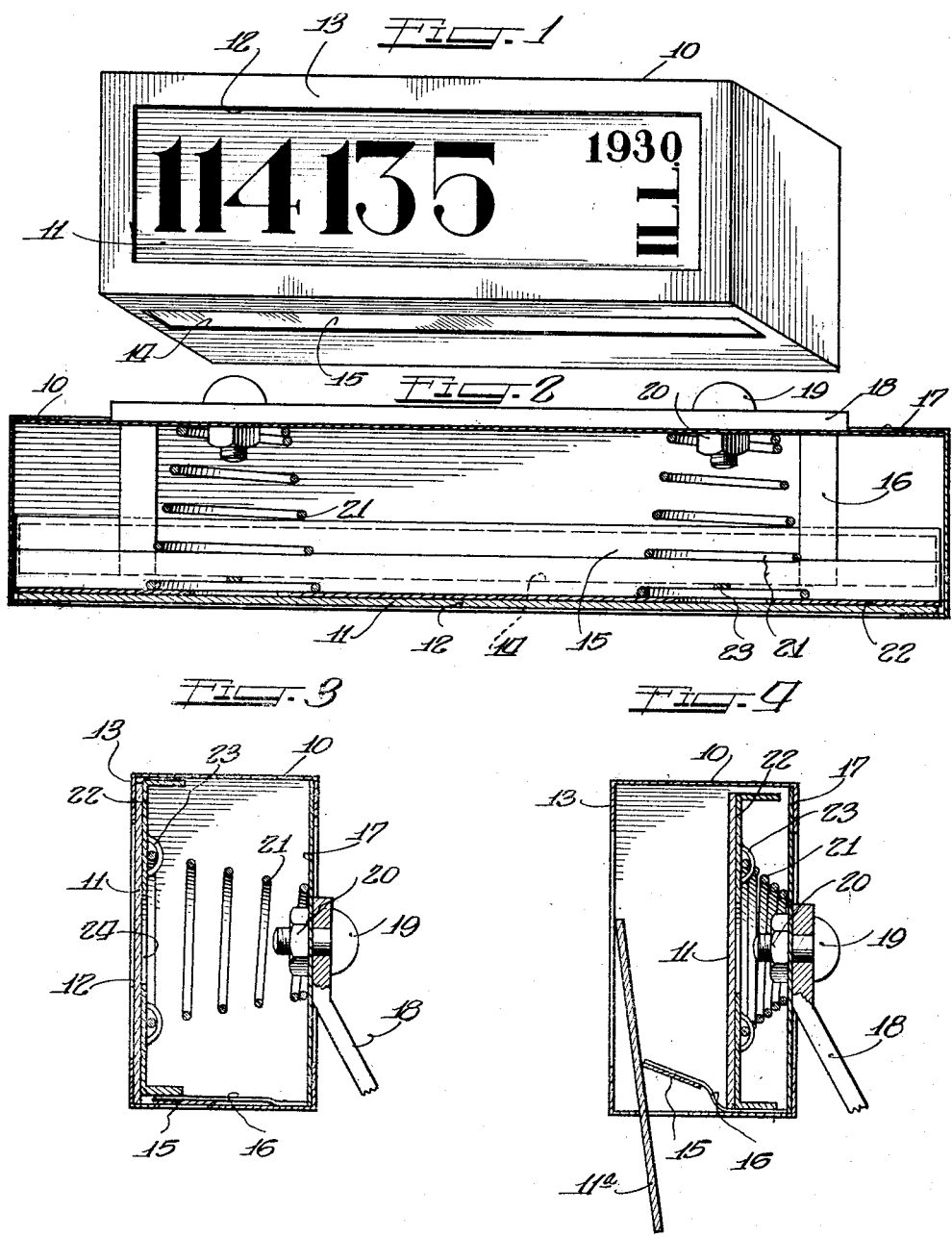

Patented Nov. 15, 1932

1,887,727

UNITED STATES PATENT OFFICE

DENNIS T. ADAMS, OF CHICAGO, ILLINOIS

AUTOMOBILE LICENSE HOLDER

Application filed July 15, 1931. Serial No. 550,839.

This invention relates to improvements in holders for license number plates, and the like, such as are used upon automobiles and other vehicles.

Heretofore, in the prior art devices of this type, it has been the usual practice to construct automobile license holders wherein the holder is fitted with some form of key locking means for preventing unauthorized removal of the license plate from the holder. Key-actuated locks are objectionable in that the license plate is only changed at long intervals, thereby making it necessary to use the key occasionally, with the result that there is a possibility of the key becoming lost. In other forms of license plate holders, various means have been provided for automatically locking the holder without the use of a key so as to prevent removal of the license plate. In the license plate holders of this form, it is the usual practice to employ a mechanic to remove the old license plate by means of a blow torch or some other tool which destroys the plate. Obviously, such a procedure is inconvenient and although it may not be exceedingly expensive, it does necessitate an expenditure which otherwise would not have to be made.

In order to overcome these and other objections to the prior art devices, it is a primary object of this invention to provide a license holder of this character that is so designed that a license plate, when once inserted into the holder, is automatically locked against removal from the holder, thereby preventing unscrupulous persons from stealing the license plate.

It is a further object of the invention to provide a license plate holder which is adapted to receive a plurality of license plates, thereby making it unnecessary to remove the old plates before a new plate may be inserted.

Another object of the invention is to provide a license plate holder having improved means for locking the plate in the holder, which are arranged in such a manner as to enable the insertion of a new plate without the use of tools, and will automatically secure the plate against removal from the holder once the plate is inserted therein, no key being necessary to accomplish the locking operation.

It is also an object of the invention to provide novel and unique means for securing the license plate holder to a support, which is so arranged that the securement may be conveniently and easily accomplished before a license plate is inserted into the holder, but which is shielded against removal as soon as a license plate is inserted into the holder.

In accordance with the general features of this invention, it is proposed to provide a casing of sufficient depth to receive therein a plurality of license plates. The license plates are insertable into the casing through a slot having a hinged closure. In order to maintain the plates against a window opening in the casing, there is provided a resiliently actuated follower which is arranged so that when the follower is towards the window of the casing, it will be effective to prevent opening of the closure for the slot through which the license plates are inserted into the casing. By manually moving the license plates in the casing and the follower to the rear of the casing, the closure of the aforementioned slot is freed so that it may be opened for the insertion of a new license plate.

Another feature of the invention resides in the manner in which the casing is secured to a support and the means which are provided for preventing access to the securing means for the casing, after a license plate is once inserted into the casing. For this purpose, bolts are provided which are inserted through a supporting bracket and extend into the casing, the inner end of these bolts being engaged by suitable nuts. In order to enable the tightening of these nuts, apertures are provided in the follower so that when there is no license plate within the casing, a tool may be inserted through the window of the casing, then through the opening in the follower so as to engage the nuts on the holding bolts. As soon as a license plate is inserted into the casing, the openings in the follower are closed and it is then impossible to remove the casing from its support.

Other objects and features of this invention will more fully appear from the following detail description taken in connection with the accompanying drawing which illustrates a single embodiment thereof, and in which Figure 1 is a perspective view showing an automobile license holder which embodies the features of my invention;

Figure 2 is an enlarged horizontal sectional view showing the interior mechanism of the holder;

Figure 3 is an enlarged transverse sectional view showing the license plate and follower at the open front of the casing of the holder; and Figure 4 is a view similar to Figure 3 except that the follower and license plate within the casing are shown moved to the rear of the casing, and an additional license plate being inserted into the casing.

As shown on the drawing:

In the illustrated embodiment of my invention, there is shown a casing which is generally indicated by the numeral 10. This casing is of sufficient depth to receive a plurality of license plates 11 and 11a and is preferably constructed of metal which should be of sufficient thickness to prevent any ordinary attempt to make an entrance to the interior of the casing of sufficient size to remove the license plate. The front face of the casing is provided with an opening 12 which forms a window through which the indicia on the license plate are visible. This window is preferably made smaller than the license plate and is of such size that an inwardly extending flange 13 completely surrounds the window, this flange providing an abutment for the license plate. The license plates are inserted into the casing through a slot 14 which is disposed directly behind the window and extends longitudinally of the casing. This slot is normally closed by a member 15 which is in the form of a plate having its rear edge secured to the bottom of the casing by means of spring straps 16 which enable the member 15 to be swung upwardly at such times as it is desired to insert a license plate into the casing.

The rear wall of the casing is illustrated as being formed of a back plate 17 which is secured to the casing proper in any suitable manner, as by welding, riveting and the like. The casing is secured to a supporting bracket 18, which may be carried by the automobile or other vehicle, by means of a round-headed bolt 19 which extends through the bracket and back plate of the casing and is engaged at its threaded end by a nut 20 which is disposed on the inside of the casing.

Surrounding the nut 20 and having an end abutting the back plate 17 of the casing is a coil spring 21 which is connected at its other end to a channel shaped follower member 22 which is provided with spaced deflected portions 23 which form eyelets through which the end coil of the spring extends. The follower 22 is provided with an opening 24 which is in axial alignment with the axis of the spring and is of such size that when the follower is manually moved to the rear of the casing, there will be sufficient clearance to enable a tool to be inserted through the window 12 and opening 24 so as to engage the nut 20 for tightening the same. It will be observed that when a license plate is inserted into the casing, the plate covers the opening 24, thereby preventing access to the nut 20 so that it may be loosened and the casing with the license plate therein removed from the bracket 18.

When the follower 22 is in the forward portion of the casing, it overlies the plate member 15 and locks the same in closed position over the slot 14, thereby preventing the insertion or removal of a license plate into or out of the casing. In order that a new license plate may be inserted into the casing, the follower 22 and license plate which has been previously inserted into the casing are conjointly moved to the rear of the casing as shown in Figure 4. This movement of the follower carries it to such a position that the member 15 is released and may be rotated upwardly to enable the insertion of a new license plate 11a. As soon as the new license plate is within the casing, the follower and the license plate or plates which are already in the casing are automatically actuated to the front of the casing, in which position the new license plate is held against the front face of the casing with its indicia visible through the window 12. As soon as the follower and license plate are in the forward part of the casing, the member 15 is again locked over the slot 14. With this arrangement, license plates may be successively inserted into the casing, and once being in the casing cannot be removed, thereby preventing stealing or removal of the plates from the vehicle by unscrupulous persons.

From the foregoing, it will be evident that my invention provides an improved license plate holder arranged for successively receiving a plurality of license plates, which cannot be removed once they have been inserted in the casing of the holder; which does not require a key in order to lock the plates within the holder, but which is so constructed that the plates are automatically locked in the holder as soon as they are inserted in the casing; and in which novel means are provided for securing the holder to a support on the vehicle, these means being so designed that the holder may be initially installed without difficulty on the bracket and arranged so that as soon as a license plate is inserted within the casing, it is then impossible to remove the casing from its supporting bracket without the use of appropriate tools or mutilation of the holder.

Now, it is of course to be understood that although I have described in detail the preferred embodiment of my invention, the invention is not to be thus limited but only insofar as defined by the scope and spirit of the appended claims.

I claim as my invention:

1. A license plate holder comprising a casing having an open front forming a window and a slot in one side adapted to receive a plurality of identification plates insertable through said slot into said casing, a closure for said slot, and means for forcing said plates after they are in the casing against the front of the casing, said means and closure being associated in such a manner as to enable the plates to be successively inserted and prevent the removal of the plates from the casing once they have been inserted.

2. A license plate holder comprising a casing having an open front forming a window and a slot in one side adapted to enable insertion of an identification plate into the casing, a hinged closure member for said slot on the inside of said casing, a follower in the casing, and spring means for normally actuating the follower towards the front of the casing, said follower in its normal position being so disposed as to lock the closure member against opening and release the closure member upon being moved to the rear of the casing.

3. A license plate holder comprising a casing having an open front defining a window and a slot extending longitudially of the bottom of the casing adapted to enable an identification plate to be inserted into the casing, said slot being immediately in the rear of the window, a closure member for the slot, means for resiliently actuating the closure member to a position closing the slot, a follower in the casing, spring means for actuating the follower to a position towards the front of the casing, the follower in this position latching the closure member against opening, and upon being manually moved to the rear of the casing enabling opening of the closure member.

4. A magazine holder for identification plates comprising a casing having an open front forming a window, and a slot in one side through which the plates are inserted into the casing, a spring actuated closure member for said slot supported within said casing so as to swing inwardly to enable the insertion of a plate, means within the casing to normally force the inserted plates to the front of the casing, and means to latch the closure member against opening, when the plates are normally disposed in the front of the casing, and release the member when the plates are pushed to the rear of the casing, said plates in the latter position being so disposed relative to the slot as to prevent their removal therethrough, but enable the insertion of another plate.

In testimony whereof I have hereunto subscribed my name at Chicago, Cook County, Illinois.

DENNIS T. ADAMS.